Dec. 1, 1931.  E. B. PLENGE  1,834,803

DYNAMO ELECTRIC MACHINE

Filed Jan. 17, 1930

Inventor
Edward B. Plenge,
by Charles E. Tullar
His Attorney.

Patented Dec. 1, 1931

1,834,803

UNITED STATES PATENT OFFICE

EDWARD B. PLENGE, OF SCHENECTADY, NEW YORK, ASSIGNOR TO GENERAL ELECTRIC COMPANY, A CORPORATION OF NEW YORK

DYNAMO ELECTRIC MACHINE

Application filed January 17, 1930. Serial No. 421,529.

My invention relates to dynamo-electric machines.

In a dynamo-electric machine as ordinarily constructed, having a rotor provided with salient poles or a distributed winding, there is considerable windage loss at the ends of the rotor because the ends of the poles and the other irregular portions of the rotatable member move about in a body of air which is stationary or is moving at a much slower speed than the rotatable member. As a result there is a great deal of eddying of the air adjacent the rotatable member which causes high air resistance.

The object of my invention is to provide a dynamo-electric machine construction which will avoid eddying of the air at the ends of the rotatable member and thereby reduce windage loss. I accomplish this by providing a dynamo-electric machine having a rotatable member including a disk secured thereto, which is arranged close to the end of the rotatable member and extends about the entire end-portion thereof.

My invention will be more fully set forth in the following description referring to the accompanying drawings, and the features of novelty which characterize my invention will be pointed out with particularity in the claims annexed thereto and forming a part of this specification.

Figure 1:
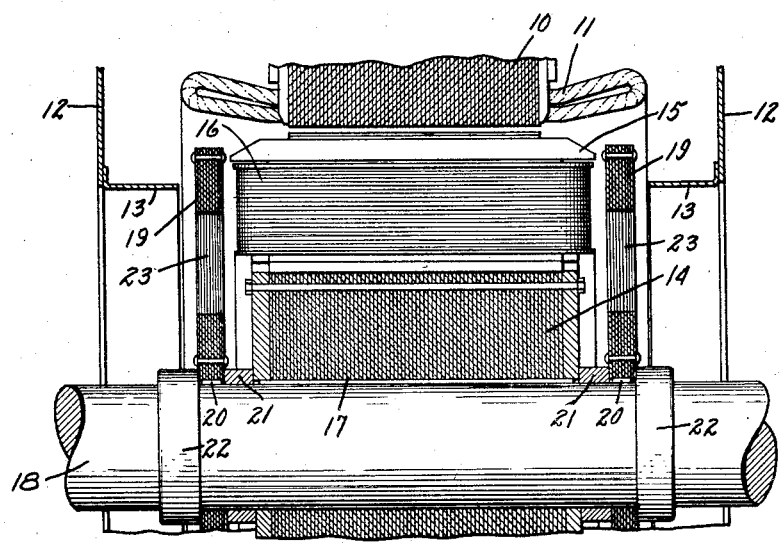
Figure 2:
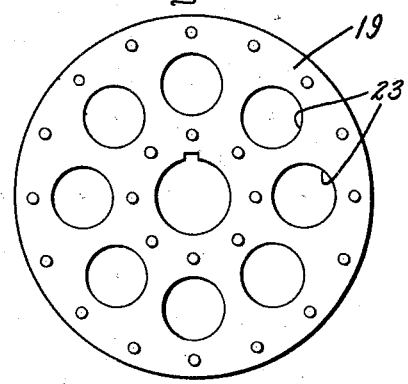

In the drawings, Fig. 1 is a fragmentary longitudinal section of a dynamo electric machine embodying my invention, and Fig. 2 is an end view of a disk which I employ in carrying out my invention.

Referring to the drawings for convenience of illustration, I have shown my invention in connection with a salient pole type dynamo electric machine including a stationary member 10 having a winding 11 thereon and end-shields 12 having cylindrical portions 13 extending toward the rotatable member of the machine to provide a central opening for the admission of cooling air thereto. The rotatable member includes a core structure 14 having salient poles 15 keyed thereto which are provided with field exciting windings 16. The core structure 14 is keyed as indicated at 17 to a shaft 18 which is supported in bearings in the usual manner.

In order to provide a smooth surface at the ends of the rotatable member which will cause little or no eddying of the stationary, or slowly moving air passing into the machine, I fasten disks 19 to the shaft 18 as by keys 20. These disks extend about the entire end-portion of the rotatable member. They are arranged between the cylindrical portions 13 of the end-shields and the rotatable member, and close to the latter. The plates or disks 19 are retained in desired relation to the rotatable member between collars 21 and a clamping collar 22 secured to the shaft 18. Adequate circulation of air through the machine is insured by providing openings 23 in the disks 19 at the base of the poles 15. By this arrangement the stationary or slowly moving air passing into the machine offers small frictional resistance to the rotation of the rotatable member as the surface of the disks are smooth. Moreover the body of air between the disks and the rotatable member moves at the speed of the rotatable member so that it offers no frictional resistance to rotation thereof.

Although I have shown my invention in connection with a salient pole dynamo-electric machine, I do not desire to be limited thereto, and I intend in the appended claims to cover all modifications which do not depart from the spirit and scope of my invention.

What I claim as new and desire to secure by Letters Patent of the United States, is:

1. A dynamo-electric machine having a rotatable member provided with salient poles, and disks secured in spaced relation thereto, a stationary member having end shields provided with openings therein at the ends of said rotatable member, said disks being arranged close to the ends of said rotatable member inside of said end shields so as to reduce windage loss and having openings therein at the base of said poles for the circulation of air.

2. A dynamo-electric machine having stationary and rotatable members, end shields having central openings at the ends of said rotatable member, and disks secured to said rotatable member and provided with openings for the circulation of air, said disks being arranged inside of said end-shields and extending about the entire end-portions of said rotatable member in spaced relation thereto so as to reduce windage loss.

3. A dynamo-electric machine having a stationary member and a rotatable member provided with salient poles, end-shields having central openings at the ends of said rotatable member, and disks secured to said rotatable member and provided with openings at the bases of said poles for the circulation of air, said disks being arranged inside of said end-shields and extending about the entire end-portions of said rotatable member so as to reduce windage loss.

In witness whereof I have hereunto set my hand this 16th day of January, 1930.

EDWARD B. PLENGE.